United States Patent
Henry (10) Patent No.: US 12,555,327 B1
(45) Date of Patent: Feb. 17, 2026

(54) SYSTEMS AND METHODS FOR MATCHING VOLUMETRIC OBJECTS TO ARTIFICIAL REALITY ENVIRONMENTS

(71) Applicant: Meta Platforms Technologies, LLC, Menlo Park, CA (US)

(72) Inventor: Colleen Kelly Henry, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 234 days.

(21) Appl. No.: 18/156,422

(22) Filed: Jan. 19, 2023

(51) Int. Cl.
*G06T 19/00* (2011.01)
*G06V 20/20* (2022.01)
*G06V 20/70* (2022.01)

(52) U.S. Cl.
CPC ............ *G06T 19/006* (2013.01); *G06V 20/20* (2022.01); *G06V 20/70* (2022.01)

(58) Field of Classification Search
CPC ....... G06T 19/006; G06V 20/20; G06V 20/70
See application file for complete search history.

(56) References Cited

U.S. PATENT DOCUMENTS

| | | | | |
|---|---|---|---|---|
| 9,978,202 | B2* | 5/2018 | Keilwert | H04N 13/366 |
| 10,936,080 | B2* | 3/2021 | Marcolina | G06F 3/011 |
| 11,417,069 | B1* | 8/2022 | Gupta | G06V 20/70 |
| 2002/0109680 | A1* | 8/2002 | Orbanes | G06F 16/954 |
| | | | | 345/418 |
| 2007/0038944 | A1* | 2/2007 | Carignano | G06T 19/006 |
| | | | | 715/757 |
| 2011/0187726 | A1* | 8/2011 | Suto | G06T 13/00 |
| | | | | 345/473 |
| 2012/0113223 | A1* | 5/2012 | Hilliges | G06F 3/011 |
| | | | | 348/46 |
| 2013/0328927 | A1* | 12/2013 | Mount | G06T 19/20 |
| | | | | 345/633 |
| 2015/0235447 | A1* | 8/2015 | Abovitz | G02B 27/4205 |
| | | | | 345/633 |
| 2017/0160815 | A1* | 6/2017 | Glazier | G06F 3/017 |
| 2019/0050137 | A1* | 2/2019 | Mildrew | G06T 15/20 |
| 2019/0102953 | A1* | 4/2019 | Lindsay | G06F 3/0482 |
| 2021/0064217 | A1* | 3/2021 | Mildrew | G06T 15/20 |

(Continued)

*Primary Examiner* — YuJang Tswei
(74) *Attorney, Agent, or Firm* — EVERSHEDS SUTHERLAND (US) LLP (57) ABSTRACT

A computer-implemented method for matching volumetric objects to artificial reality environments may include (i) identifying a volumetric object created within an artificial reality environment and an original spatial relationship between the volumetric object and the artificial reality environment, (ii) applying a tag to the volumetric object that defines an aspect of a spatial relationship between the volumetric object and any environment in which the volumetric object is positioned, (iii) detecting that the volumetric object is positioned in an environment that is not compatible with the original spatial relationship between the volumetric object and the artificial reality environment in which the volumetric object was created, and (iv) adjusting the aspect of the spatial relationship between the volumetric object and the environment based on the tag that defines the aspect of the spatial relationship between the volumetric object and the environment. Various other methods, systems, and computer-readable media are also disclosed.

20 Claims, 8 Drawing Sheets

(56) References Cited

U.S. PATENT DOCUMENTS

| | | | |
|---|---|---|---|
| 2021/0090333 A1* | 3/2021 | Ravasz | G02B 27/01 |
| 2022/0001292 A1* | 1/2022 | Chen | A63H 30/04 |
| 2022/0012923 A1* | 1/2022 | Lebeck | G06F 3/14 |
| 2022/0084279 A1* | 3/2022 | Lindmeier | G06F 3/012 |
| 2022/0086419 A1* | 3/2022 | Qaderi | G03H 1/02 |
| 2022/0122328 A1* | 4/2022 | Giovannetti | G06T 7/70 |
| 2022/0254180 A1* | 8/2022 | Berliner | G06F 3/04815 |
| 2023/0142054 A1* | 5/2023 | Qaderi | G03H 1/0005 |
| | | | 359/23 |
| 2024/0071006 A1* | 2/2024 | Kratz | G06N 3/044 |

\* cited by examiner

SYSTEMS AND METHODS FOR MATCHING VOLUMETRIC OBJECTS TO ARTIFICIAL REALITY ENVIRONMENTS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

A fully virtual environment can be any shape and size, while partially physical and partially virtual environments (e.g., augmented reality environments) are the shape and size of the physical location they are based in. Currently, no coherent system exists for translating between a fully virtual and a partially physical and partially virtual environment. The present disclosure is generally directed to systems and methods for a reactive design for artificial reality (AR) environments and objects that enables a creator to tag objects with metadata that indicates how objects should be handled when converting from the virtual environment in which the objects were created to another environment, such as an augmented reality environment or a virtual reality environment of a different size. For example, an object such as a sculpture may be tagged to scale down to 50% of the height of the ceiling, scaling all other aspects proportionally, but not display at all if the final size is less than 12" tall. In another example, an object such as a television or painting may be tagged to be displayed on the nearest obstruction-free vertical surface at least two feet wide. In some embodiments, the systems described herein may enable a user to create classes of objects, such as tagging all "sculpture" objects to scale similarly and/or in relation to one another. By enabling users to easily create ways for their virtual objects to display coherently in environments of all shapes and sizes, the disclosed system may vastly improve the ability of AR creators to share their environments in high quality with users in a large variety of situations.

In some embodiments, the systems described herein may improve the functioning of a computing device by enabling the computing device to intelligently scale virtual objects to match different environments. Additionally, the systems described herein may improve the fields of AR environment design and/or AR communication by scaling volumetric objects to fit the constraints of partially or fully virtual environments of different dimensions and layouts, enabling creators of volumetric objects to display their creations in a wider variety of environments without tedious manual rescaling.

Figure 1:
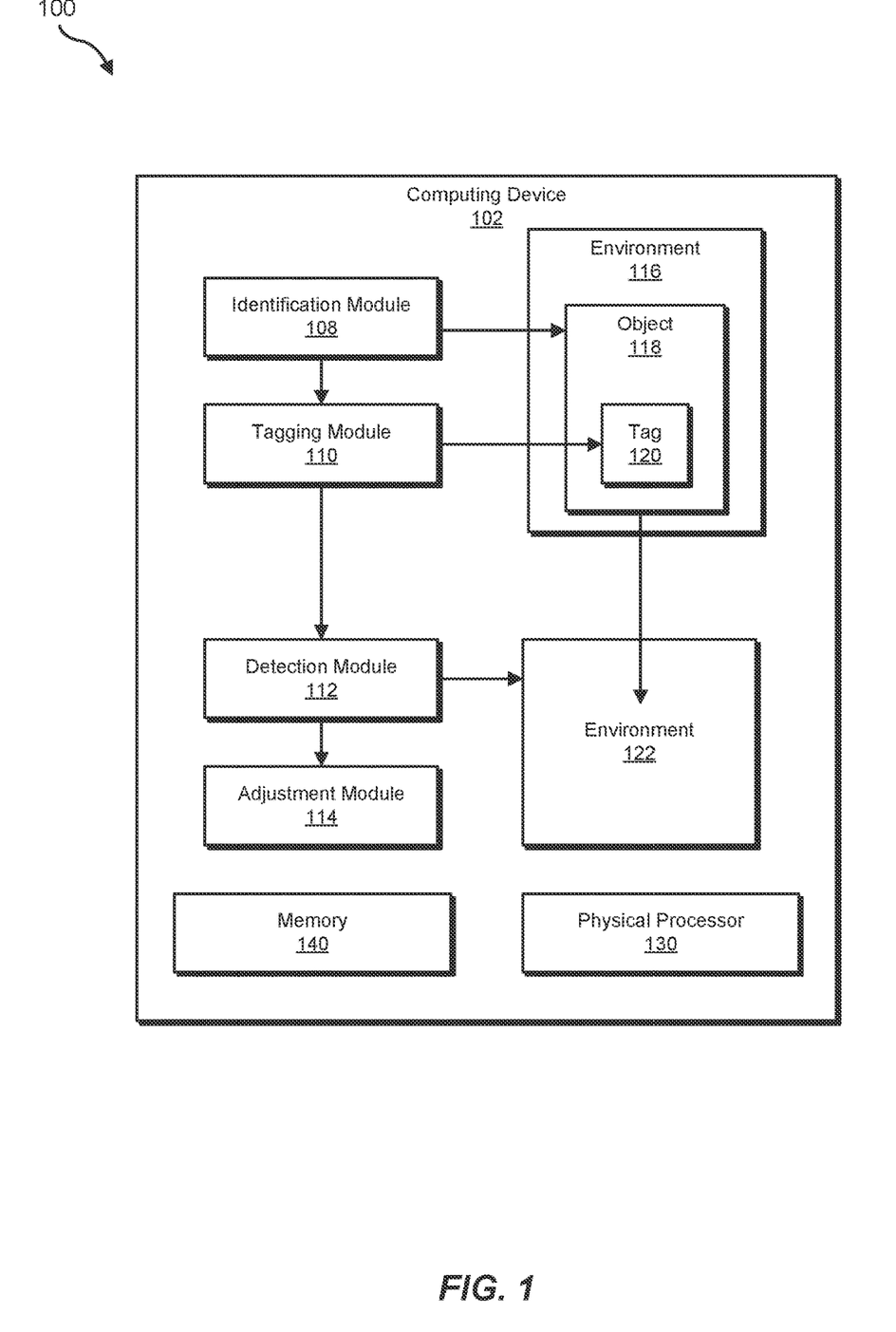
FIG. 1 is a block diagram of an exemplary system for matching volumetric objects to artificial reality environments.

In some embodiments, the systems described herein may match volumetric objects to AR environments via tagging the volumetric objects. FIG. 1 is a block diagram of an exemplary system 100 for matching volumetric objects to AR environments. In one embodiment, and as will be described in greater detail below, a computing device 102 may be configured with an identification module 108 that may identify a volumetric object 118 created within an AR environment 116 and an original spatial relationship between object 118 and environment 116. Next, a tagging module 110 may apply a tag 120 to object 118 that defines an aspect of a spatial relationship between object 118 and any environment in which object 118 is positioned. At some later time, a detection module 112 may detect that object 118 is positioned in an environment 122 that is not compatible with the original spatial relationship between object 118 and environment 116. In response, an adjustment module 114 may adjust the aspect of the spatial relationship between object 118 and environment 122 based on tag 120.

Computing device 102 generally represents any type or form of computing device capable of reading computer-executable instructions. For example, computing device 102 may represent an AR device that generates and/or displays an AR environment. Additional examples of computing device 102 may include, without limitation, a laptop, a desktop, a wearable device, a smart device, an artificial reality device, a personal digital assistant (PDA), etc. Although illustrated as a single entity in FIG. 1, computing device 102 may include and/or represent a group of multiple devices that operate in conjunction with one another, such as an original AR device that creates object 118 in environment 116 and a separate AR device that displays object 118 in environment 122.

Environment 116 generally represents any virtual environment generated by one or more AR devices. In some embodiments, due to being virtual, environment 116 may not have constraints on spatial dimensions or may have difficult-to-exceed constraints (e.g., a vertical dimension that may be at most one mile high) imposed by processing, storage, and/or display limitations. The term AR environment may generally refer to any environment that is partially or fully virtual. In some examples, an AR environment may be a fully virtual environment with no physical elements. In other examples, an AR environment may be a partially virtual and partially physical environment, such as an augmented or mixed reality environment that overlays virtual volumetric objects over a physical environment. An augmented or mixed reality environment may overlay virtual objects over a physical environment via a pass-through display that visually renders the virtual objects (e.g., overlays the virtual objects) over a physical environment that is visible through the display. The details of AR environments will be further discussed in combination with FIGS. 7 and 8. Environment 122 generally represents any AR environment with constraints on one or more spatial dimensions. For example, environment 122 may be an augmented reality environment that is constrained to the physical dimensions of a physical location or a virtual environment that is constrained due to being a predesigned virtual environment with specific dimensions (e.g., the interior of a virtual house).

Object 118, the term volumetric object, or the term virtual object generally refers to any data that defines a three-dimensional object in an AR environment. A virtual object may have various dimensions, such as height, width, and/or depth. In some embodiments, a virtual object may have additional properties, such as color, transparency, or reflectivity. In some examples, a virtual object may represent a physical object, such as a virtual chair or virtual television. In other examples, a virtual object may be an object that does not exist in the physical world, such as an abstract virtual sculpture. In some examples, a virtual object may be made up of other virtual objects, such as a tree that is composed of a trunk, branches, and leaves that may each be separately defined virtual objects.

Tag 120 generally represents any metadata associated with a virtual object that defines an aspect of a spatial relationship between the object and an AR environment. In some embodiments, a tag may define this relationship directly, such as by defining a relationship between the height of the object and the vertical dimension of the AR environment. Additionally or alternatively, a tag may define this relationship indefinitely, by tagging the object as belonging to a class of objects, where the class defines the aspect of the spatial relationship for all objects within the class. In some examples, a tag may define aspects of the spatial relationship between different dimensions of the object, such as indicating that an object will scale based on the height of the environment and the width and depth of the object will scale proportionally to the height of the object.

In some examples, a tag may define multiple aspects of one or more spatial relationships. Additionally or alternatively, an object may be tagged with multiple tags. For example, one object may be tagged with one tag that defines the spatial relationship between the object's height and the environment's vertical dimension and a second tag that defines the spatial relationship between the object's width and/or depth and the environment's horizontal dimensions while a different object may be tagged with a single tag that identifies the object as belonging to a class that defines relationships for height, width, and depth. In some examples, a tag may specify a maximum repositioning distance. For example, a tag may specify that an object may be moved up to twenty feet from its original location in order to not be placed outside the bounds of the environment but will be discarded if the object would have to be moved farther than that to fit within the boundaries of the environment. Similarly, a tag may specify a maximum and/or minimum size for an object regardless of the dimensions of the environment. For example, a tag may specify that the height of an object is 50% of the height of the environment up to a maximum of ten feet or that an object is 30% of the height of the environment but will not be displayed if this scales the object down below two feet in height. A tag may specify absolute and/or relative dimensions in a variety of units, such as inches, feet, centimeters, pixels, and/or blocks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
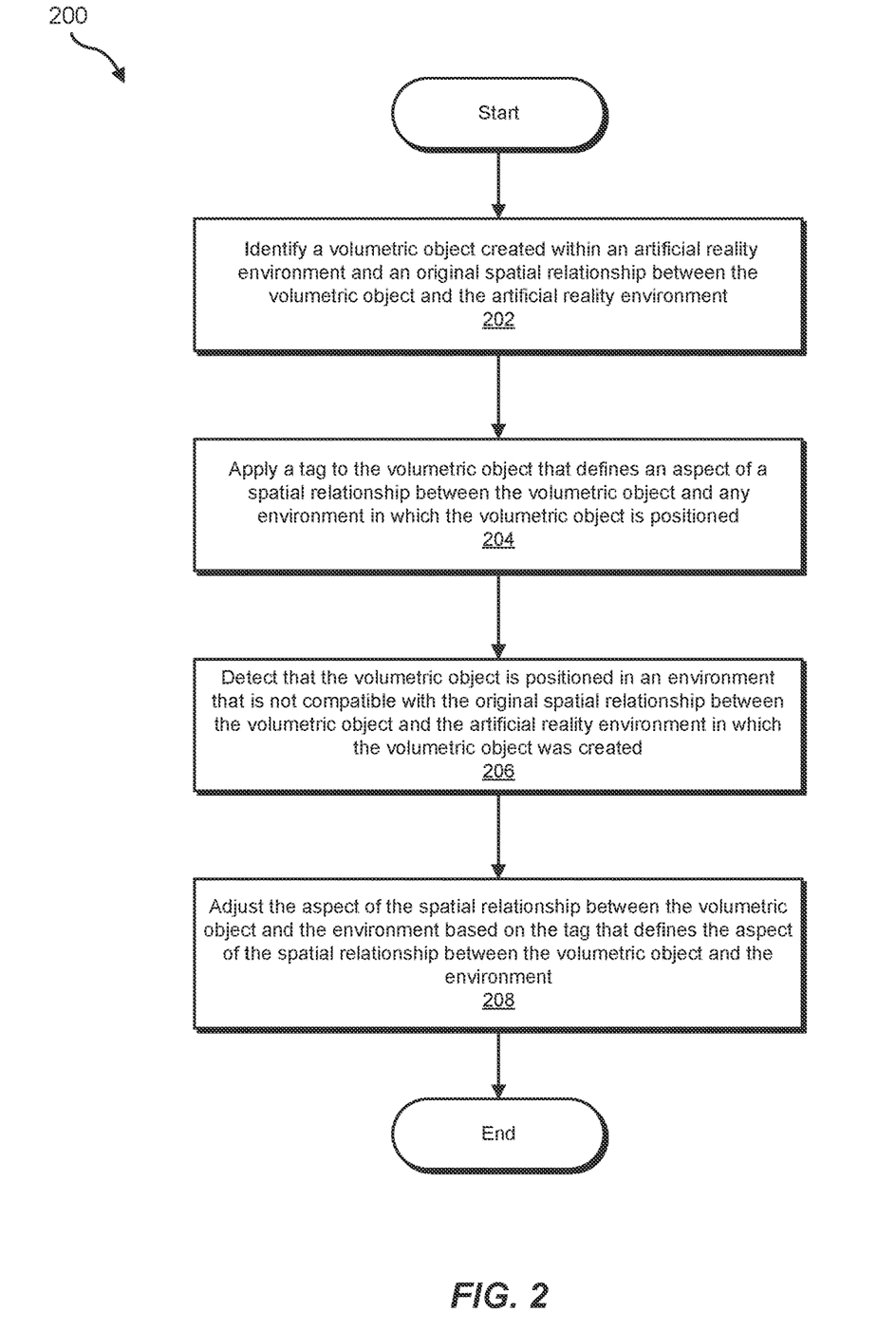
FIG. 2 is a flow diagram of an exemplary method for matching volumetric objects to artificial reality environments.

FIG. 2 is a flow diagram of an exemplary method 200 for matching volumetric objects to AR environments. In some examples, at step 202, the systems described herein may identify a volumetric object created within an AR environment and an original spatial relationship between the volumetric object and the AR environment.

The term spatial relationship generally refers to the relative or absolute size, positioning, and/or placement of a volumetric object within an environment. The term aspect of a spatial relationship refers to any single dimension or feature of this relationship. For example, a volumetric object that is half the height of a virtual room with an absolute width and depth that is positioned in a specific corner of that room has a spatial relationship to the environment that includes the virtual room that encompasses the relative height, the absolute width and depth, and the placement. In this example, one aspect of that spatial relationship is the height of the volumetric object. The term original spatial relationship refers to the spatial relationship between a volumetric object and an environment in which the object was originally created. For example, if a volumetric object is half the height of a virtual room and the original virtual room is 10' tall, the original spatial relationship is that between a 5' object and a 10' ceiling, while an adjustment to a 6' high room would produce an object that is 3' tall to maintain the relative vertical dimension aspect of the spatial relationship.

Figure 3:
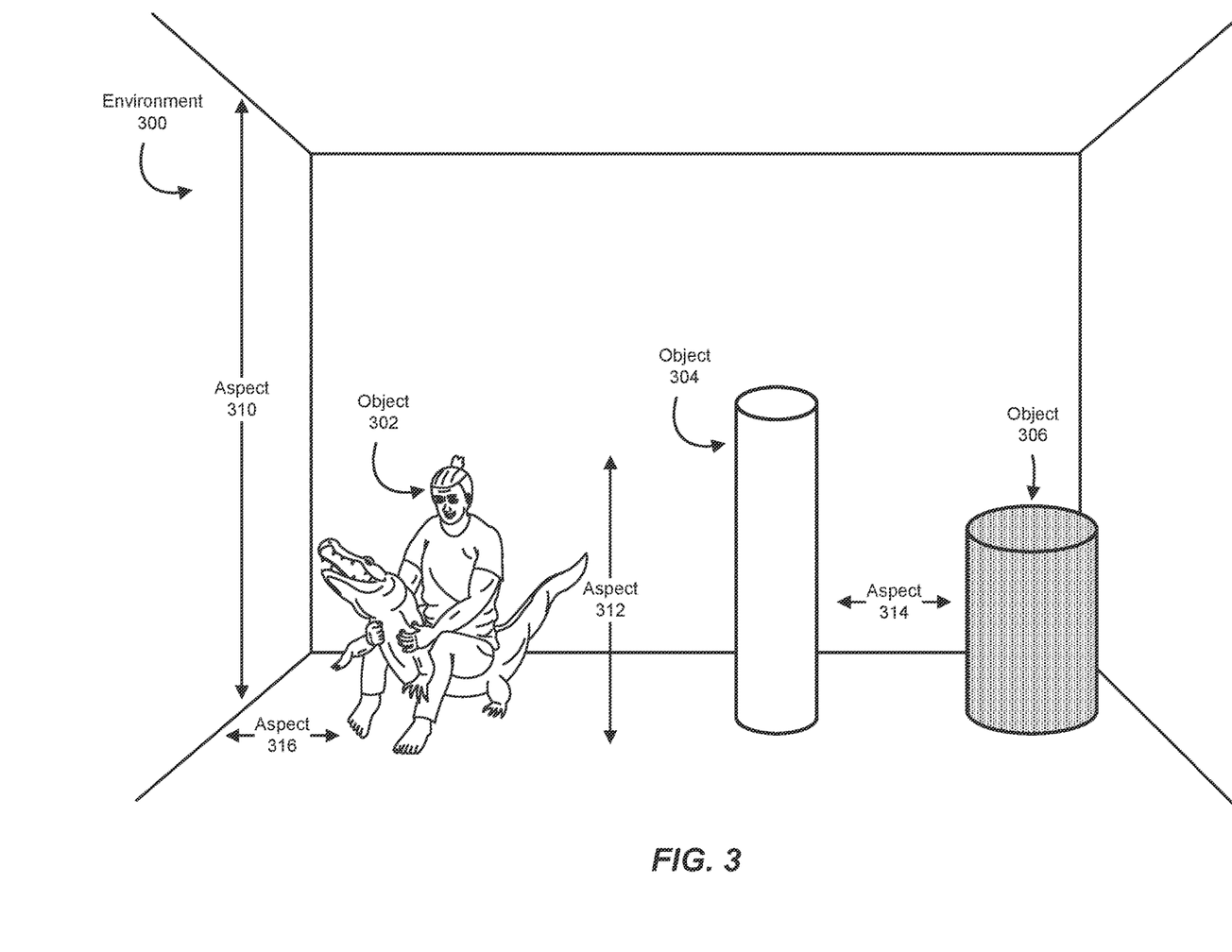
FIG. 3 is an illustration of an exemplary set of volumetric objects and accompanying aspects of spatial relationships between the objects and an environment.

The systems described herein may identify a variety of types of aspects of spatial relationships. For example, as illustrated in FIG. 3, the systems described herein may identify an environment 300 that includes objects 302, 304, and/or 306. In some examples, the aspect of the spatial relationship may include a size of a dimension of the volumetric object relative to a size of the dimension of the environment. For example, an aspect 310 of environment 300 may be a height of environment 300 that corresponds to an aspect 312 of object 302 that represents a height of object 302 relative to the height of environment 300. In some examples, the aspect of the spatial relationship may include a location of the volumetric object relative to a boundary of the environment. A boundary of an environment may include an outer limit of an environment (e.g., a point that a user cannot travel past) and/or an inner divider of an environment (e.g., a wall of a room in a virtual house). In one example, an aspect 316 of object 302 may describe a distance between object 302 and the nearest boundary of environment 300. In some examples, the aspect of the spatial relationship may be a placement, size, or location of one volumetric object relative to another. For example, an aspect 314 of object 304 may describe the distance between object 304 and object 306. In this example, if both objects are moved to an environment with different horizontal dimensions, the systems described herein may locate object 304 relative to object 306 rather than relative to the boundaries of the environment.

In some embodiments, the systems described herein may automatically identify the original spatial relationship. For example, the systems described herein may measure various aspects of the environment's shape and size as well as the object's shape, size, and/or positioning. Additionally or alternatively, the systems described herein may receive input from a user defining the original spatial relationship and/or identifying the volumetric object.

Returning to FIG. 2, at step 204, the systems described herein may apply a tag to the volumetric object that defines an aspect of a spatial relationship between the volumetric object and any environment in which the volumetric object is positioned.

The systems described herein may apply the tag in a variety of ways. In some examples, applying the tag to the volumetric object may include detecting the original spatial relationship and automatically applying the tag based on the original spatial relationship. For example, the systems described herein may detect than a vertical dimension of an object is 50% of the total vertical dimension of the environment and may automatically apply a tag to an object indicating this aspect of the spatial relationship between the object and the environment. Additionally or alternatively, applying the tag to the volumetric object may include receiving input from a user specifying the tag. For example, a user may tag an object specifying that the object has an absolute height of four feet regardless of the height of the environment and will not be displayed if the height of the environment is less than four feet. In some embodiments, the systems described herein may receive user input by providing a user with a menu of potential aspects to specify and potential options for those aspects. Additionally or alternatively, the systems described herein may enable a user to provide input in a more freeform fashion.

In some examples, applying the tag to the volumetric object may include applying a plurality of tags that define a plurality of aspects of the spatial relationship between the volumetric object and any environment in which the object is positioned. For example, the systems described herein may automatically apply and/or receive user input specifying tags for each of the height, width, depth, location, and/or placement of an object.

Figure 4:
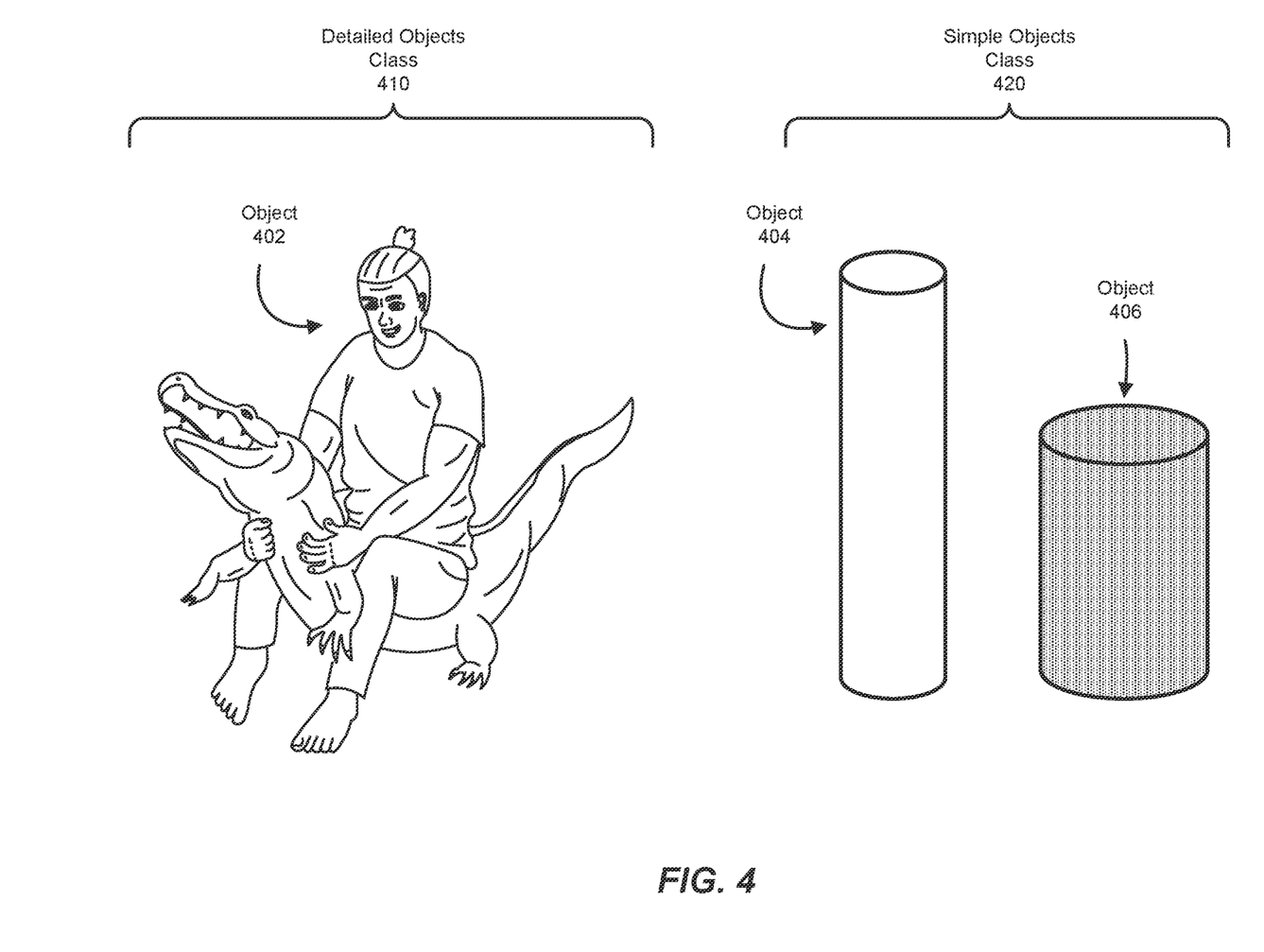
FIG. 4 is an illustration of exemplary volumetric objects divided into classes.

Additionally or alternatively, applying the tag to the volumetric object may include selecting a class from a set of classes that each define at least one aspect of the spatial relationship between any object to which the class is applied and any environment in which the object is positioned and applying the class to the volumetric object as the tag. The term class generally refers to any overarching tag category such that applying the class to an object applies all tags defined as part of the class to the object. For example, as illustrated in FIG. 4, an object 402 may be a sculpture of an alligator wrestler than has many fine details. In this example, object 402 may be in a detailed objects class 410 that specifies a minimum height, width, and depth for objects in the class below which the object will have insufficient detail and thus will not be displayed. By contrast, objects 404 and/or 406 may be smooth cylinders that are part of a simple objects class 420 that specifies that objects within the class may be scaled down indefinitely based on the dimensions of the environment in which the objects are displayed.

In some examples, the systems described herein may enable a user to define various classes and features of classes. Additionally or alternatively, the systems described herein may be preconfigured with a set of default classes. For example, the systems described herein may define a furniture class for objects that are positioned relative to boundaries of the environment and/or to other furniture objects and do not scale and a decorations class for objects that are positioned relative to one another and do scale relative to the environment. In this example, a user may quickly tag a virtual couch and table in a virtual living room with the furniture class so these objects remain at human-usable sizes regardless of the size of the virtual living room while a painting and light display tagged with the decorations class scale to be enjoyed at the maximum possible size given the dimensions of the virtual living room.

Returning to FIG. 2, at step 206, the systems described herein may detect that the volumetric object is positioned in an environment that is not compatible with the original spatial relationship between the volumetric object and the AR environment in which the volumetric object was created.

The systems described herein may detect the discrepancy in environment in a variety of ways. In one embodiment, the systems described herein may monitor when objects are loaded into an environment and may check the dimensions of the environment at that time. In some embodiments, the systems described herein may store the dimensions of the original environment in metadata associated with the objects and may compare this metadata to the dimensions of the current environment. In some examples, the systems described herein may individually check the dimensions, location, and/or placement of each object individually.

A volumetric object may be positioned in an environment that is not compatible with the original spatial relationship in a variety of ways. For example, an environment may have one or more dimensions that are too small for the original dimensions of an object, such as a ceiling that is shorter than the original height of the object. In another example, an environment may not be large enough or shaped correctly to accommodate the original positioning of a set of objects relative to one another. For example, if a set of ten objects were originally placed in a straight line with each object two meters away from the previous object, a room that is only fifteen meters long may be incompatible with the original placement of the objects. In one example, an object may have repeated segments of fixed dimensions, such as a picket fence with a repeating segment of a vertical board and two horizontal boards. In some examples, an object with repeated segments may have room for more segments in a larger environment or fewer segments in a smaller environment. In some examples, an object with an original placement relative to a specific feature of the original environment, such as hanging on a wall, in a corner, and/or a specified distance from a wall may not have an original placement that is compatible with an environment with those features in different locations from the original environment. In some embodiments, the systems described herein may overlay virtual objects over physical objects and/or pre-existing virtual objects, while in other embodiments, the systems described herein may not overlay virtual objects over other objects, potentially causing an object's size and/or placement to be incompatible with an environment that already includes an object in all or part of the new object's default location.

At step 208, the systems described herein may adjust the aspect of the spatial relationship between the volumetric object and the environment based on the tag that defines the aspect of the spatial relationship between the volumetric object and the environment.

The systems described herein may adjust the aspect in a variety of ways. For example, the systems may scale one or more dimensions of the object to be smaller and/or larger based on the relative dimensions of the current environment to the environment in which the object was created. Additionally or alternatively, the systems described herein may reposition objects within the environment to account for different dimensions and/or features in the current environment compared to the original environment.

Figure 5A:
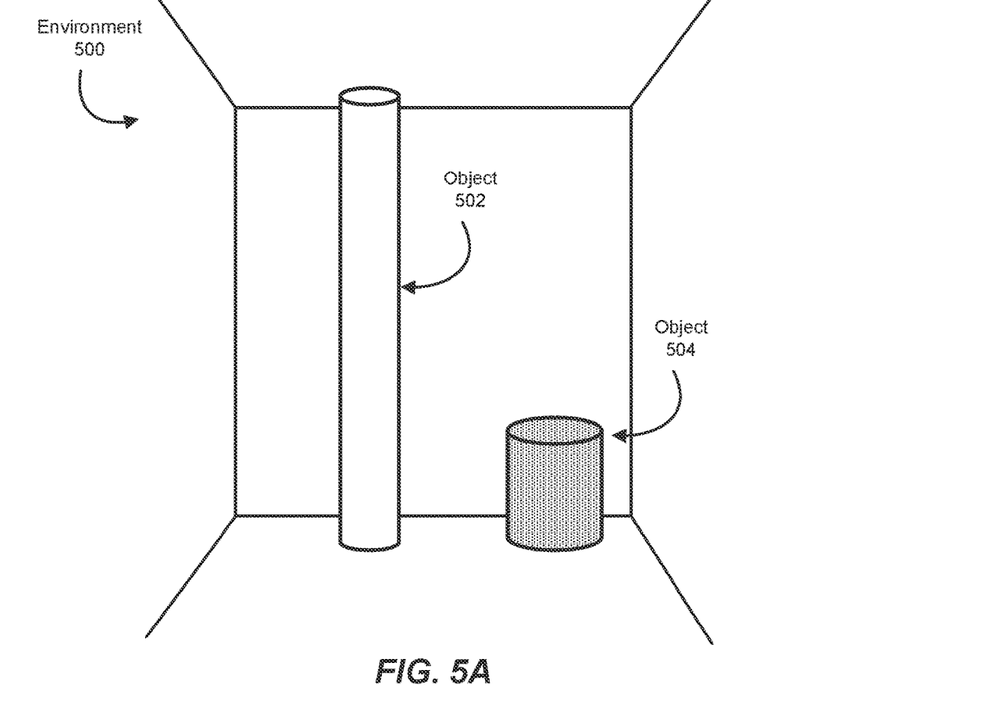
FIGS. 5A and 5B are illustrations of exemplary volumetric objects scaled to match two different environments.
Figure 5B:
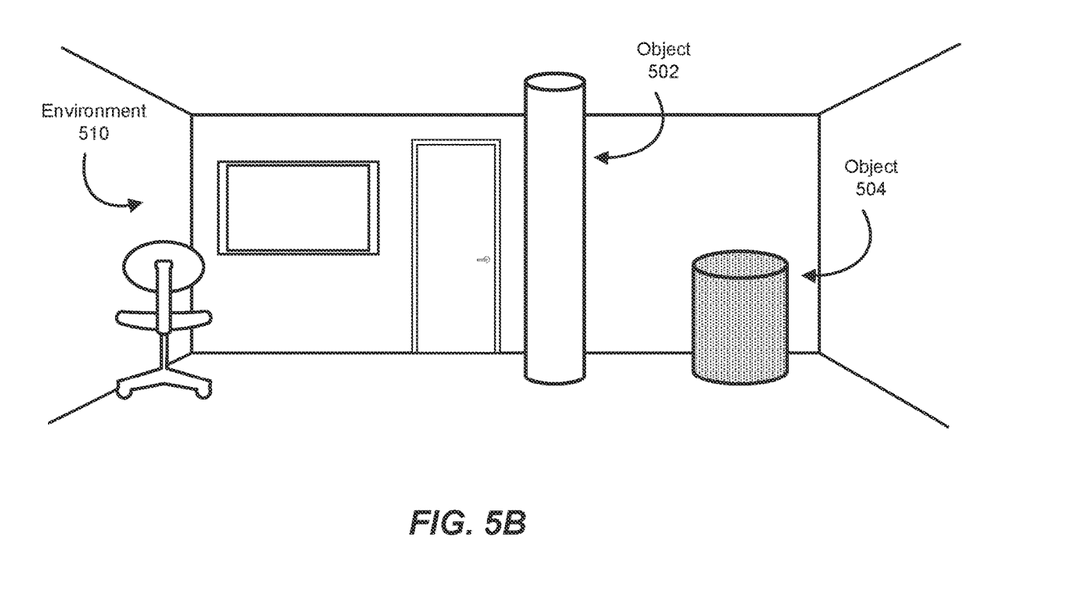

In some examples, the systems described herein may scale some objects but not others based on different tags applied to the object. For example, as illustrated in FIG. 5A, objects 502 and 504 may have been created in an environment 500 that is entirely virtual. In this example, object 502 may be tagged with a tag that defines the vertical dimension of object 502 as being equal to the total height of the environment while object 504 may be tagged with a tag that defines the vertical dimension of object 504 in absolute terms. In one example, as illustrated in FIG. 5B, an environment 510 may be an augmented reality environment with virtual objects 502 and 504 overlaid over a physical location. In this example, environment 510 may have a ceiling much lower than the height of environment 500 and as a consequence, the systems described herein may scale object 502 to be shorter in order to maintain the 1:1 ratio between the height of object 502 and the height of environment 510 (rather than having object 502 disappear through the ceiling, as it would without scaling). By contrast, object 504 may have a tag specifying an absolute height and may fit within environment 510 and the systems described herein may not adjust the height of object 504.

In some examples, adjusting the aspect of the spatial relationship between the volumetric object and the environment based on the tag may include adjusting the aspect of the spatial relationship based at least in part on an aspect of an additional volumetric object. For example, the systems described herein may receive input from a user tagging a set of objects as related and all scaling based off the size of one keystone object. In one example, a large sculpture may be scaled and/or positioned based on the environment and a set of smaller sculptures surrounding the sculpture may be scaled and/or positioned based on the large sculpture. In some examples, if a feature or object within the environment moves after the object is placed, the systems described herein may update the object based on tags to account for the change. For example, if a couch is placed relative to a coffee table and the coffee table moves, the systems described herein may update the positioning of the couch accordingly. In some embodiments, the systems described herein may tag objects with movement properties such as virtual pets. In these embodiments, the systems described herein may specify relationships to other objects such as whether the moving object may pass through other objects, be positioned on top of or beneath other objects, and so forth.

Additionally or alternatively, the aspect of the spatial relationship may include a placement of the volumetric object relative to a feature of the environment and the systems described herein may adjust the aspect by adjusting the placement of the object. A feature of an environment may be a virtual object that is a fixture of an environment (e.g., a virtual couch that is part of a preconfigured virtual house), a physical object within the environment (e.g., a physical couch in a physical house, a wall in a physical house, etc.), a terrain feature of a physical or virtual environment (e.g., a slope, a pool of water, etc.), and/or any other part of a physical or virtual environment that might occlude a virtual object.

Figure 6A:
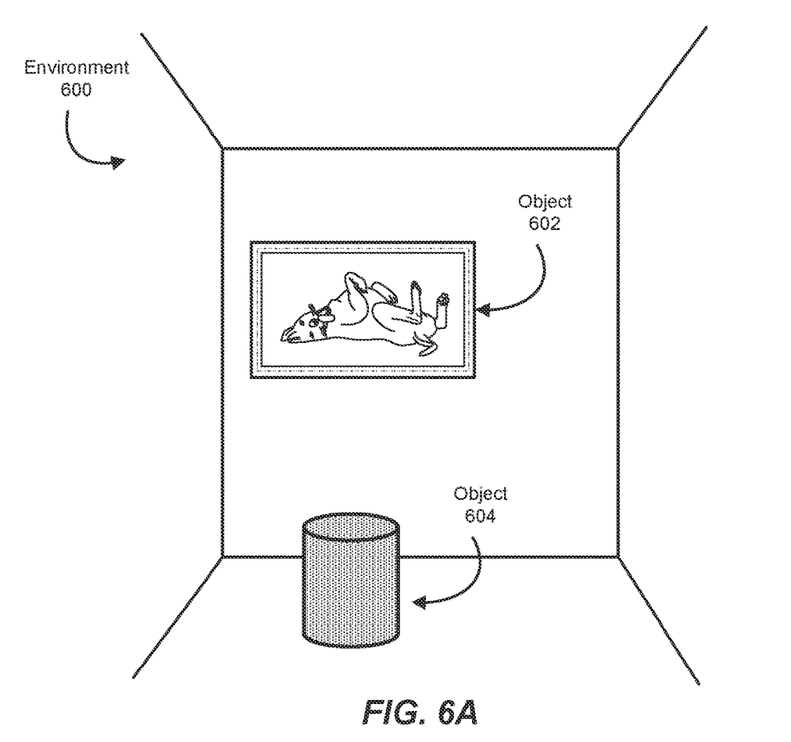
FIGS. 6A and 6B are illustrations of exemplary volumetric objects relocated to match two different environments.
Figure 6B:
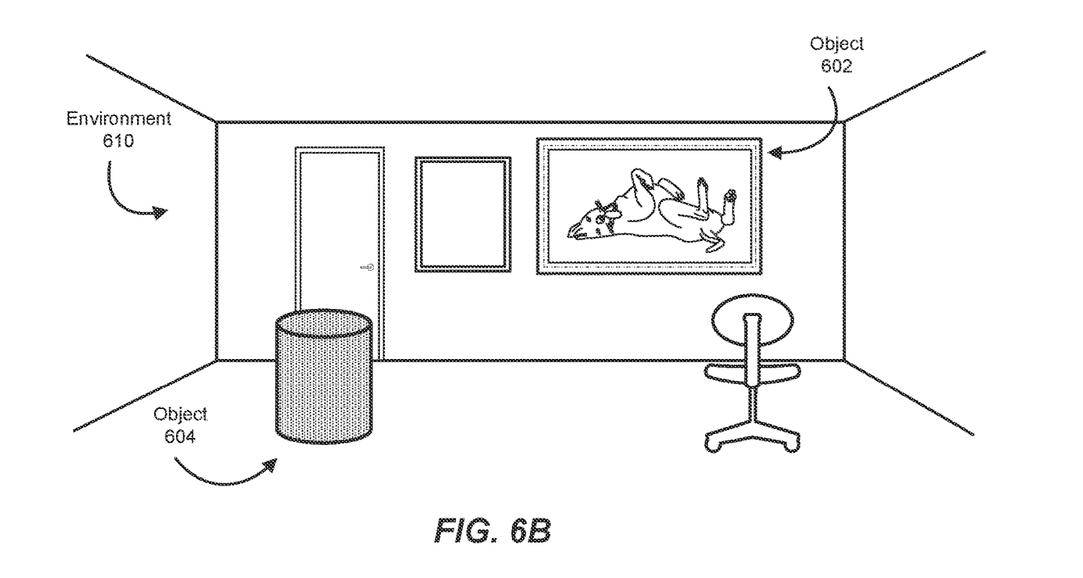

For example, as illustrated in FIG. 6A, an object 602 and an object 604 may be created in an environment 600. In this example, object 604 may be tagged with a tag that defines the position of object 604 relative to a back left corner of the environment while object 602 may be tagged with a tag indicating that object 602 should always be placed on a flat vertical surface clear of obstructions. In one example, as is illustrated in FIG. 6B, objects 602 and 604 may be displayed in an environment 610 that has different features than environment 600. In this example, object 604 may maintain its position relative to the back left corner of environment 610 while the systems described herein may adjust object 602 by moving its position to the nearest flat, unobstructed surface on the wall of environment 610. This may change the position of object 602 relative to object 604, but as long as neither object has a tag mandating relative placement to one another, the systems described herein may place the object without needing to resolve any conflict between tags.

In some embodiments, to handle a situation where an object has multiple tags that may come into conflict (e.g., a tag specifying position relative to another object and a tag specifying position relative to the environment), the systems described herein may include hierarchy information in tags that specifies the order in which tags are to be applied and/or which tags supersede other tags. For example, a tag specifying the minimum height of an object may supersede a tag specifying that the object is to be displayed at 40% of the height of another object.

As described above, the systems and methods described herein may enable users to share AR creations with users in other AR environments by automatically scaling and/or repositioning volumetric objects based on tags, rather than requiring a user to manually adjust each object or displaying objects that occlude other objects, go through boundaries, hang mid-air, or otherwise don't fit into a new AR environment. In some examples, by using tag classes, the systems described herein may enable a user to efficiently configure large numbers of objects to have similar behavior when placed in new environments. The systems described herein may improve the ease of creation and sharing of AR media of all types, from art exhibits to recreations of real environments to games.

Embodiments of the present disclosure may include or be implemented in conjunction with various types of artificial reality, virtual reality, and/or augmented reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
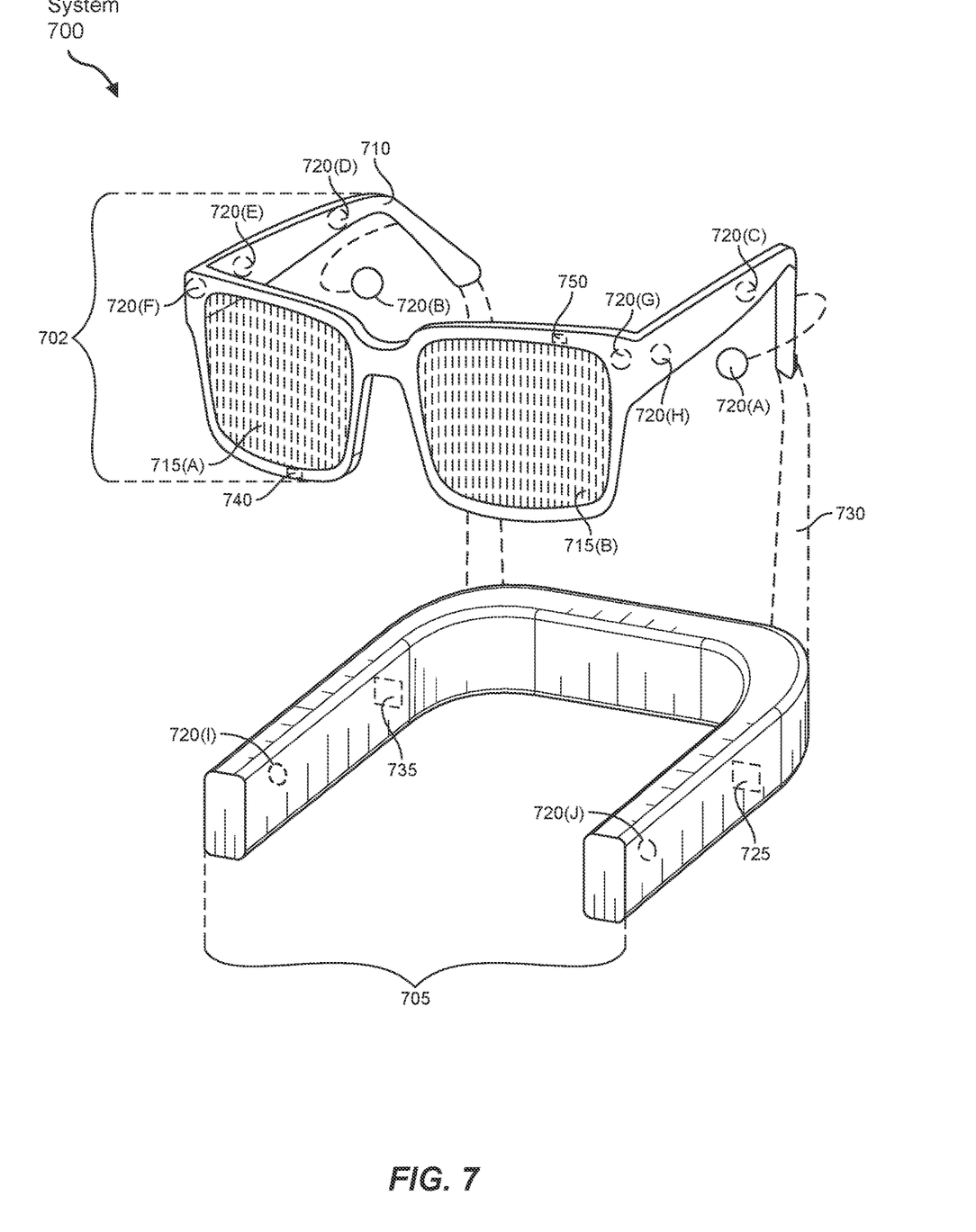
FIG. 7 is an illustration of exemplary augmented-reality glasses that may be used in connection with embodiments of this disclosure.

Turning to FIG. 7, augmented-reality system 700 may include an eyewear device 702 with a frame 710 configured to hold a left display device 715 (A) and a right display device 715 (B) in front of a user's eyes. Display devices 715 (A) and 715 (B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720 (A)-120 (J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format).

The microphone array in FIG. 7 may include, for example, ten acoustic transducers: 720 (A) and 720 (B), which may be designed to be placed inside a corresponding ear of the user, acoustic transducers 720 (C), 720 (D), 720 (E), 720 (F), 720 (G), and 720 (H), which may be positioned at various locations on frame 710, and/or acoustic transducers 720 (1) and 720 (J), which may be positioned on a corresponding neckband 705.

In some embodiments, one or more of acoustic transducers 720 (A)-(J) may be used as output transducers (e.g., speakers). For example, acoustic transducers 720 (A) and/or 720 (B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720 (A) and 720 (B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented reality system 700 may simulate binaural hearing and capture a 3D stereo sound field around about a user's head. In some embodiments, acoustic transducers 720 (A) and 720 (B) may be connected to augmented-reality system 700 via a wired connection 730, and in other embodiments acoustic transducers 720 (A) and 720 (B) may be connected to augmented-reality system 700 via a wireless connection (e.g., a BLUETOOTH connection). In still other embodiments, acoustic transducers 720 (A) and 720 (B) may not be used at all in conjunction with augmented-reality system 700.

Acoustic transducers 720 on frame 710 may be positioned in a variety of different ways, including along the length of the temples, across the bridge, above or below display devices 715 (A) and 715 (B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720 (I) and 720 (J)) that are part of the microphone array (or potentially form their own microphone subarray). Neckband 705 may also include a controller 725 and a power source 735.

Acoustic transducers 720 (I) and 720 (J) of neckband 705 may be configured to detect sound and convert the detected sound into an electronic format (analog or digital). In the embodiment of FIG. 7, acoustic transducers 720 (I) and 720 (J) may be positioned on neckband 705, thereby increasing the distance between the neckband acoustic transducers 720 (I) and 720 (J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720 (C) and 720 (D) and the distance between acoustic transducers 720 (C) and 720 (D) is greater than, e.g., the distance between acoustic transducers 720 (D) and 720 (E), the determined source location of the detected sound may be more accurate than if the sound had been detected by acoustic transducers 720 (D) and 720 (E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium-ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806 (A) and 806 (B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Figure 8:
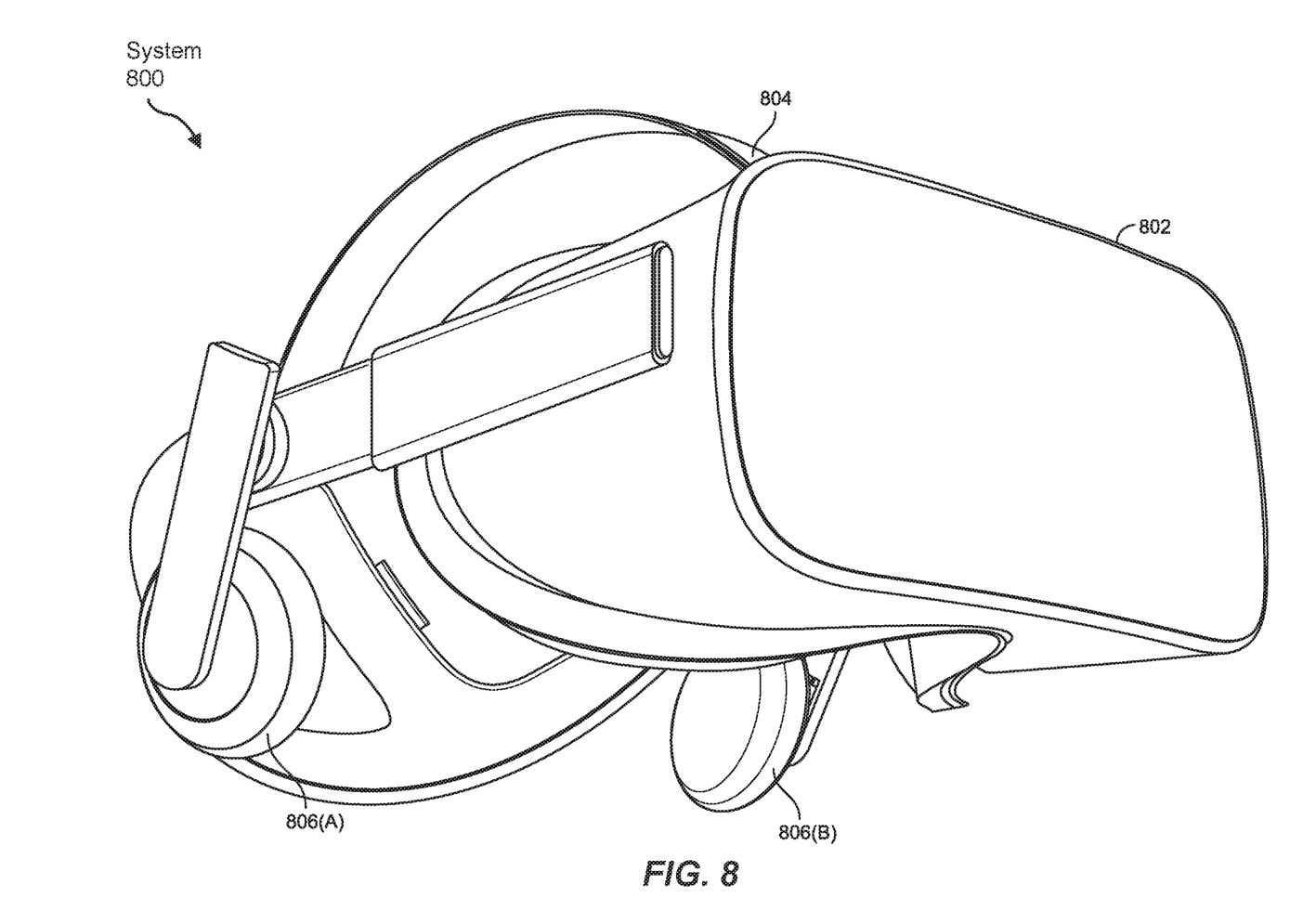
FIG. 8 is an illustration of an exemplary virtual-reality headset that may be used in connection with embodiments of this disclosure.

Artificial reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCOS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

EXAMPLE EMBODIMENTS

Example 1: A method for matching volumetric objects to AR environments may include (i) identifying a volumetric object created within an artificial reality environment and an original spatial relationship between the volumetric object and the artificial reality environment, (ii) applying a tag to the volumetric object that defines an aspect of a spatial relationship between the volumetric object and any environment in which the volumetric object is positioned, (iii) detecting that the volumetric object is positioned in an environment that is not compatible with the original spatial relationship between the volumetric object and the artificial reality environment in which the volumetric object was created, and (iv) adjusting the aspect of the spatial relationship between the volumetric object and the environment based on the tag that defines the aspect of the spatial relationship between the volumetric object and the environment.

Example 2: The computer-implemented method of example 1, where applying the tag to the volumetric object includes detecting the original spatial relationship and automatically applying the tag based on the original spatial relationship.

Example 3: The computer-implemented method of examples 1-2, where applying the tag to the volumetric object includes receiving input from a user specifying the tag.

Example 4: The computer-implemented method of examples 1-3, where applying the tag to the volumetric object includes selecting a class from a set of classes that each define at least one aspect of the spatial relationship between any object to which the class is applied and any environment in which the object is positioned and applying the class to the volumetric object as the tag.

Example 5: The computer-implemented method of examples 1-4, where the environment includes an augmented reality environment that includes virtual volumetric objects overlaid over a physical environment.

Example 6: The computer-implemented method of examples 1-5, where the aspect of the spatial relationship includes a size of a dimension of the volumetric object relative to a size of the dimension of the environment.

Example 7: The computer-implemented method of examples 1-6, where the aspect of the spatial relationship includes a location of the volumetric object relative to a boundary of the environment.

Example 8: The computer-implemented method of examples 1-7, where the aspect of the spatial relationship includes a placement of the volumetric object relative to a feature of the environment.

Example 9: The computer-implemented method of examples 1-8, where applying the tag to the volumetric object includes applying a plurality of tags that define a plurality of aspects of the spatial relationship between the volumetric object and any environment in which the object is positioned and adjusting the aspect of the spatial relationship between the volumetric object and the environment includes adjusting a plurality of aspects of the volumetric object based on at least a portion of the plurality of tags.

Example 10: The computer-implemented method of examples 1-9, where adjusting the aspect of the spatial relationship between the volumetric object and the environment based on the tag that defines the aspect of the spatial relationship between the volumetric object and the environment includes adjusting the aspect of the spatial relationship based at least in part on an aspect of an additional volumetric object.

Example 11: A system for matching volumetric objects to AR environments may include at least one physical processor and physical memory including computer-executable instructions that, when executed by the physical processor, cause the physical processor to (i) identify a volumetric object created within an artificial reality environment and an original spatial relationship between the volumetric object and the artificial reality environment, (ii) apply a tag to the volumetric object that defines an aspect of a spatial relationship between the volumetric object and any environment in which the volumetric object is positioned, (iii) detect that the volumetric object is positioned in an environment that is not compatible with the original spatial relationship between the volumetric object and the artificial reality environment in which the volumetric object was created, and (iv) adjust the aspect of the spatial relationship between the volumetric object and the environment based on the tag that defines the aspect of the spatial relationship between the volumetric object and the environment.

Example 12: The system of example 11, where applying the tag to the volumetric object includes detecting the original spatial relationship and automatically applying the tag based on the original spatial relationship.

Example 13: The system of examples 11-12, where applying the tag to the volumetric object includes receiving input from a user specifying the tag.

Example 14: The system of examples 11-13, where applying the tag to the volumetric object includes selecting a class from a set of classes that each define at least one aspect of the spatial relationship between any object to which the class is applied and any environment in which the object is positioned and applying the class to the volumetric object as the tag.

Example 15: The system of examples 11-14, where the environment includes an augmented reality environment that includes virtual volumetric objects overlaid over a physical environment.

Example 16: The system of examples 11-15, where the aspect of the spatial relationship includes a size of a dimension of the volumetric object relative to a size of the dimension of the environment.

Example 17: The system of examples 14-16, where the aspect of the spatial relationship includes a location of the volumetric object relative to a boundary of the environment.

Example 18: The system of examples 11-17, where the aspect of the spatial relationship includes a placement of the volumetric object relative to a feature of the environment.

Example 19: The system of examples 11-18, where applying the tag to the volumetric object includes applying a plurality of tags that define a plurality of aspects of the spatial relationship between the volumetric object and any environment in which the object is positioned; and adjusting the aspect of the spatial relationship between the volumetric object and the environment comprises adjusting a plurality of aspects of the volumetric object based on at least a portion of the plurality of tags.

Example 20: A non-transitory computer-readable medium may include one or more computer-readable instructions that, when executed by at least one processor of a computing device, cause the computing device to (i) identify a volumetric object created within an artificial reality environment and an original spatial relationship between the volumetric object and the artificial reality environment, (ii) apply a tag to the volumetric object that defines an aspect of a spatial relationship between the volumetric object and any environment in which the volumetric object is positioned, (iii) detect that the volumetric object is positioned in an environment that is not compatible with the original spatial relationship between the volumetric object and the artificial reality environment in which the volumetric object was created, and (iv) adjust the aspect of the spatial relationship between the volumetric object and the environment based on the tag that defines the aspect of the spatial relationship between the volumetric object and the environment.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive volumetric data to be transformed, transform the volumetric data by rescaling and/or repositioning a volumetric object, output a result of the transformation to display volumetric objects in an AR environment, use the result of the transformation to enable a user to view and/or interact with volumetric objects in an AR environment, and store the result of the transformation to resume the display at a later time. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying a first volumetric object created within a first artificial reality environment in a first size and an original spatial relationship between the first volumetric object in the first size and the first artificial reality environment;
    applying a first tag to the first volumetric object that defines an aspect of a spatial relationship between the first volumetric object and any environment in which the first volumetric object is positioned, wherein the first tag specifies how the first volumetric object should be re-sized to maintain the aspect of the spatial relationship when converting from the first artificial reality environment to a different artificial reality environment;
    detecting that the first volumetric object is positioned in a second artificial reality environment and that the first volumetric object in the first size within the second artificial reality environment fails to satisfy the spatial relationship defined by the first tag; and
    adjusting the first volumetric object to a second size within the second artificial reality environment to satisfy the aspect of the spatial relationship between the first volumetric object and the second artificial reality environment based on the first tag.

2. The computer-implemented method of claim 1, wherein applying the first tag to the first volumetric object comprises detecting the original spatial relationship and automatically applying the first tag based on the original spatial relationship.

3. The computer-implemented method of claim 1, wherein applying the first tag to the first volumetric object comprises receiving input from a user specifying the first tag.

4. The computer-implemented method of claim 1, wherein applying the first tag to the first volumetric object comprises:
    selecting a first class from a set of classes that each define at least one aspect of the spatial relationship between any object to which the class is applied and any environment in which the object is positioned; and
    applying the first class to the first volumetric object as the first tag.

5. The method of claim 4, further comprising:
    applying a second class to a second volumetric object;
    detecting that the second volumetric object is positioned in the second artificial reality environment and that the second volumetric object in a third size within the second artificial reality environment fails to satisfy the spatial relationship defined by a second tag; and
    ceasing to display the second volumetric object within the second artificial reality environment instead of re-sizing the second volumetric object based on the second volumetric object being the second class and failing to satisfy the spatial relationship defined by the second tag within the second artificial reality environment.

6. The computer-implemented method of claim 1, wherein the first artificial reality environment comprises virtual volumetric objects overlaid over a physical environment.

7. The computer-implemented method of claim 1, wherein the aspect of the spatial relationship comprises a size of a dimension of the first volumetric object relative to a size of the dimension of the environment.

8. The computer-implemented method of claim 1, wherein the aspect of the spatial relationship comprises at least one of: a location of the first volumetric object relative to a boundary of the environment or a placement of the first volumetric object relative to a feature of the environment.

9. The computer-implemented method of claim 1, wherein:
applying the first tag to the first volumetric object comprises applying a plurality of tags that define a plurality of aspects of the spatial relationship between the first volumetric object and any environment in which the first volumetric object is positioned; and
adjusting the aspect of the spatial relationship between the first volumetric object and the environment comprises adjusting a plurality of aspects of the first volumetric object based on at least a portion of the plurality of tags.

10. The computer-implemented method of claim 1, wherein adjusting the aspect of the spatial relationship between the first volumetric object and the second artificial reality environment based on the first tag comprises adjusting the aspect of the spatial relationship based at least in part on an aspect of an additional volumetric object.

11. A system comprising:
at least one physical processor; and
physical memory comprising computer-executable instructions that, when executed by the physical processor, cause the physical processor to:
identify a first volumetric object created within a first artificial reality environment in a first size and an original spatial relationship between the first volumetric object in the first size and the first artificial reality environment;
apply a first tag to the first volumetric object that defines an aspect of a spatial relationship between the first volumetric object and any environment in which the first volumetric object is positioned, wherein the first tag specifies how the first volumetric object should be re-sized to maintain the aspect of the spatial relationship when converting from the first artificial reality environment to a different artificial reality environment;
detect that the first volumetric object is positioned in a second artificial reality environment and that the first volumetric object in the first size within the second artificial reality environment fails to satisfy the spatial relationship defined by the first tag; and
adjust the first volumetric object to a second size within the second artificial reality environment to satisfy the aspect of the spatial relationship between the first volumetric object and the second artificial reality environment based on the first tag.

12. The system of claim 11, wherein applying the first tag to the first volumetric object comprises detecting the original spatial relationship and automatically applying the first tag based on the original spatial relationship.

13. The system of claim 11, wherein applying the first tag to the first volumetric object comprises receiving input from a user specifying the first tag.

14. The system of claim 11, wherein applying the first tag to the first volumetric object comprises:
selecting a first class from a set of classes that each define at least one aspect of the spatial relationship between any object to which the class is applied and any environment in which the object is positioned; and
applying the first class to the first volumetric object as the first tag.

15. The system of claim 11, wherein the first artificial reality environment comprises virtual volumetric objects overlaid over a physical environment.

16. The system of claim 11, wherein the aspect of the spatial relationship comprises a size of a dimension of the first volumetric object relative to a size of the dimension of the environment.

17. The system of claim 11, wherein the aspect of the spatial relationship comprises a location of the first volumetric object relative to a boundary of the environment.

18. The system of claim 11, wherein the aspect of the spatial relationship comprises a placement of the first volumetric object relative to a feature of the environment.

19. The system of claim 11, wherein:
applying the first tag to the first volumetric object comprises applying a plurality of tags that define a plurality of aspects of the spatial relationship between the first volumetric object and any environment in which the first volumetric object is positioned; and
adjusting the aspect of the spatial relationship between the first volumetric object and the environment comprises adjusting a plurality of aspects of the first volumetric object based on at least a portion of the plurality of tags.

20. A non-transitory computer-readable medium comprising one or more computer-readable instructions that, when executed by at least one processor of a computing device, cause the computing device to:
identify a first volumetric object created within a first artificial reality environment in a first size and an original spatial relationship between the first volumetric object in the first size and the first artificial reality environment;
apply a first tag to the first volumetric object that defines an aspect of a spatial relationship between the first volumetric object and any environment in which the first volumetric object is positioned, wherein the first tag specifies how the first volumetric object should be re-sized to maintain the aspect of the spatial relationship when converting from the first artificial reality environment to a different artificial reality environment;
detect that the first volumetric object is positioned in a second artificial reality environment and that the first volumetric object in the first size within the second artificial reality environment fails to satisfy the spatial relationship defined by the first tag; and
adjust the first volumetric object to a second size within the second artificial reality environment to satisfy the aspect of the spatial relationship between the first volumetric object and the second artificial reality environment based on the first tag.

* * * * *